United States Patent [19]

Dischler

[11] 4,265,347

[45] May 5, 1981

[54] CLUTCH MECHANISM FOR POWER DRIVEN HAND TOOLS

[75] Inventor: Helmut Dischler, Neuss, Fed. Rep. of Germany

[73] Assignee: Novopress GmbH Pressen und Presswerkzeuge & Co. KG, Dusseldorf, Fed. Rep. of Germany

[21] Appl. No.: 883,192

[22] Filed: Mar. 3, 1978

[30] Foreign Application Priority Data

Mar. 8, 1977 [DE] Fed. Rep. of Germany ....... 2709946

[51] Int. Cl.³ .......................................... F16D 43/20
[52] U.S. Cl. .............................. 192/56 R; 74/421 A; 192/54
[58] Field of Search ............... 192/54, 56 R, 141, 143; 74/421 A; 30/180, 228

[56] References Cited

U.S. PATENT DOCUMENTS

| | | | |
|---|---|---|---|
| Re. 25,842 | 8/1965 | Keane et al. | 30/180 |
| 2,268,578 | 1/1942 | Eason | 192/54 X |
| 2,473,133 | 6/1949 | Bogart | 192/54 X |
| 2,660,281 | 11/1953 | Ochtman | 192/141 |
| 2,854,113 | 9/1958 | Hallden | 192/141 |
| 3,095,106 | 6/1963 | Morrison | 192/141 X |
| 3,194,367 | 7/1965 | Winter | 192/54 X |
| 3,221,852 | 12/1965 | Thomas | 192/56 R |
| 3,240,304 | 3/1966 | Wickersham | 192/56 R |
| 3,269,498 | 8/1966 | Hoenig et al. | 192/56 R |
| 3,693,254 | 9/1972 | Salonen | 30/228 |

FOREIGN PATENT DOCUMENTS

| | | | |
|---|---|---|---|
| 929343 | 6/1955 | Fed. Rep. of Germany | |
| 730889 | 8/1932 | France | 74/421 A |
| 525481 | 8/1940 | United Kingdom | 192/54 |

OTHER PUBLICATIONS

"Elektrische Handschere", *Industrieanzeiger*, Essen, No. 29, Apr. 9, 1954, p. 7.

*Primary Examiner*—Rodney H. Bonck
*Attorney, Agent, or Firm*—Michael T. Platt; Stanford W. Berman; Irwin M. Aisenberg

[57] ABSTRACT

A clutch and safety overload for portable, power driven, hand tools is described. The clutch comprises a fixed half and a movable half which are urged into contact with each other more firmly as the load requirements increase. The load torque is fed back to the movable clutch half by a gear driven by the output spindle and which meshes with helical gearing carried by a jackshaft on which the movable clutch half is mounted. In one embodiment the overload safety is part of the clutch itself and involves a rotation of the movable clutch half in response to an overload condition, and against a spring force, which causes it to be displaced axially with respect to the jackshaft and out of engagement with the fixed clutch half. In a second embodiment, the overload safety comprises a mechanical linkage which disengages the clutch halves when the output stroke of the driven tool exceeds a predetermined amount.

14 Claims, 5 Drawing Figures

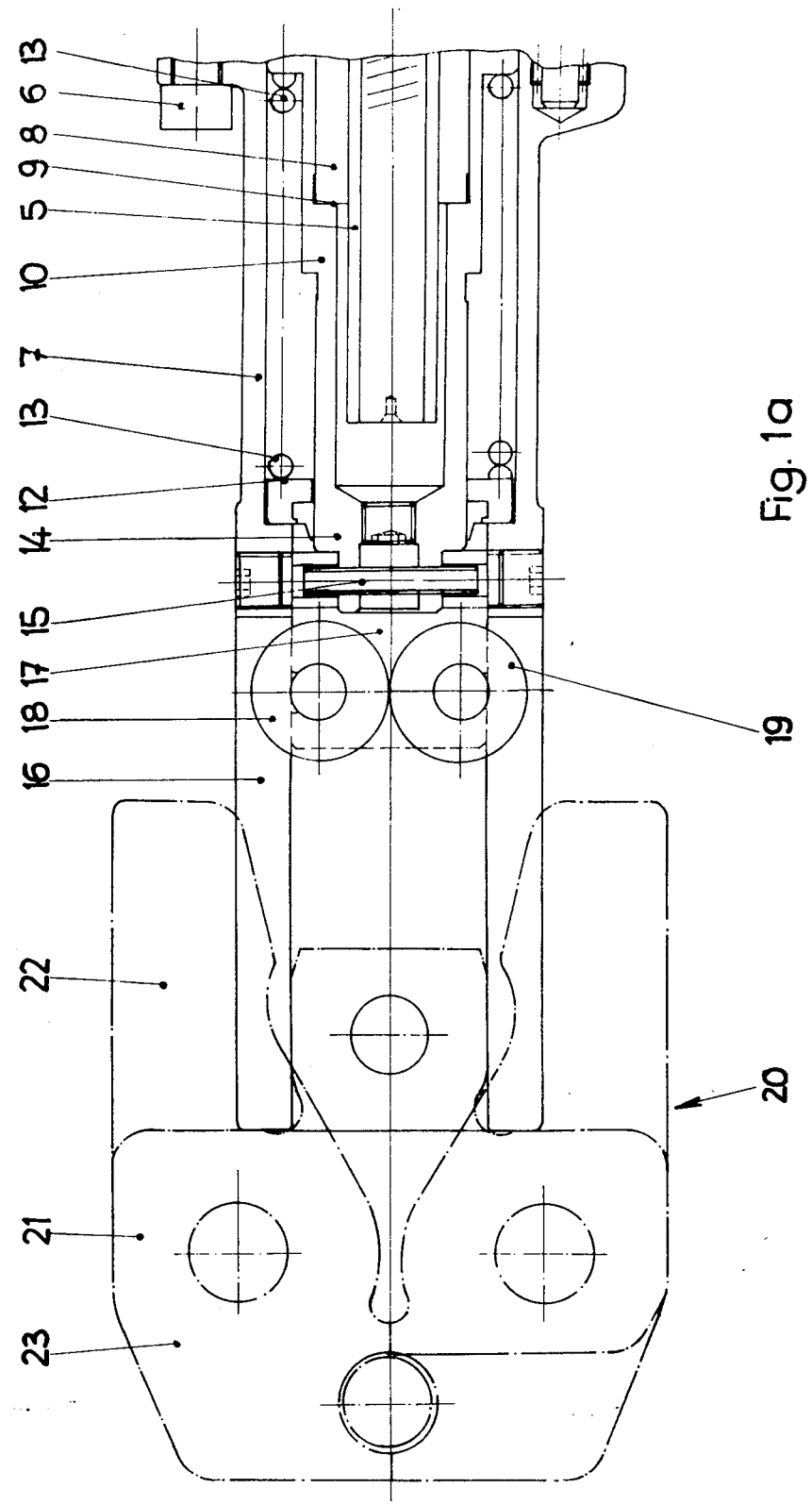

CLUTCH MECHANISM FOR POWER DRIVEN HAND TOOLS

FIELD OF THE INVENTION

This invention relates to improvements in portable tools for cutting, pressing, or the like, which utilize a housing containing an electric motor, gear assembly, clutch, and drive for the tool, wherein the clutch comprises two clutch halves, one of which can be shifted with relation to the other against a spring force and can, at the beginning of the work stroke, be connected to the other clutch half by a control outside the housing.

DESCRIPTION OF THE PRIOR ART

An example of a prior art tool of this general type is set forth in German Pat. No. 929,343 and in the magazine "Industrieanzeiger, Essen" No. 29, Apr. 9, 1954, page 7. This tool is a portable shears, with a worm gear, whose worm wheel forms the clutch half which is firmly connected with the gear and which cooperates with a disk which acts as a movable clutch half and which can be connected from outside of the housing to the worm wheel, against a spring force. After the motor is running, the clutch can be engaged, so that the motor start-up difficulties can be overcome prior to the motor's full output being transmitted to the tool. The clutch can also be opened at any time, for example, during the desired working step or after the working step, without any time delay in transmitting the action to the tool.

Of course, the output, which can be transmitted to the tool by the motor, depends on the coupling pressure with which the two clutch halves are urged against each other. Because the coupling force is applied from outside the housing and by hand, it is naturally limited. Even if the motor had an output greater than the transmissible output, the shears could be used only for doing the kind of work where the necessary work output is no greater than the transmissible output. In many cases, portable tools are required to yield a work output greater than that produced by a tool such as the above-described shears wherein the transmissible clutch output, which depends on the force applied by the operator, is limited.

SUMMARY OF THE INVENTION

The primary object of the present invention therefore is to improve the prior art portable tool of the kind described above so that its output will be independent of the activating force exerted by an operator.

This problem is solved by utilizing a clutch wherein the two halves are urged against each other in proportion to the torque applied to the workpiece. A mechanical feedback mechanism is utilized to urge the two clutch halves together up to a predetermined limit at which point an overload clutch mechanism separates the two clutch halves. Such a clutch requires a considerably smaller operating force. To engage the clutch, it is merely necessary to overcome a spring force between the two clutch halves.

An axially shiftable shaft, associated with the movable element of the clutch, carries outside helical gearing which is engaged by a rotating gear to generate an axial force on the shaft, thus pressing the two clutch halves together in relation to the transmitted torque. It is desirable to use helical gearing at about a 45° angle to avoid binding of the gears. This helical gearing can, at the same time, be used in conjunction with an overload safety, as will be explained more fully below.

The overload safety is preferably designed as a part of the operating clutch. One clutch half is positioned in an axially shiftable manner, on the axially shiftable shaft. A gear rim is attached to the shaft which, during engagement of the clutch, abuts against inside tooth gearing carried by the movable clutch half. The two sets of gear teeth are staggered with respect to each other and are normally retained in this condition by a spring attached between the shaft and the movable clutch half. When an overload occurs, the excess torque is transmitted to the axially shiftable shaft via its helical gearing. This will result in a rotation of the movable clutch half if the excess torque is sufficient to overcome the spring force. This rotation causes the two sets of gear teeth to mesh and the movable clutch half to shift axially with respect to the shaft and away from the fixed clutch half. As a result, the two clutch halves are separated without any need for manual clutch deactivation. Only when the tool is deactivated, is the overload safety reversed so that the two sets of gear teeth are staggered with respect to each other and the clutch can once again act as an operating clutch.

In an alternative design of the overload safety, an end stop coupled to the movable clutch half is engaged at the end of the working stroke and is moved a short distance, whereby it disengages the clutch. In general, the end stop should be adjusted so that only one specific tool movement is possible, so that, for example, the blades of a cutting tool will move only a predetermined distance in order to avoid any damage to the workpiece or the tool.

Both the operating clutch, with load-dependent switch-off, and the alternative design wherein the operating clutch is opened by the end stop, facilitate a very accurate and reproducible adjustment of the particular transmitted working force which controls the desired tool movement distance. Both of these embodiments can be housed in a space-saving manner in a portable tool housing and can utilize, for example, the housing and motor of a commercially available hand power drill.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts throughout the several figures, and in which:

DESCRIPTION OF PREFERRED EMBODIMENTS

Figure 1B:
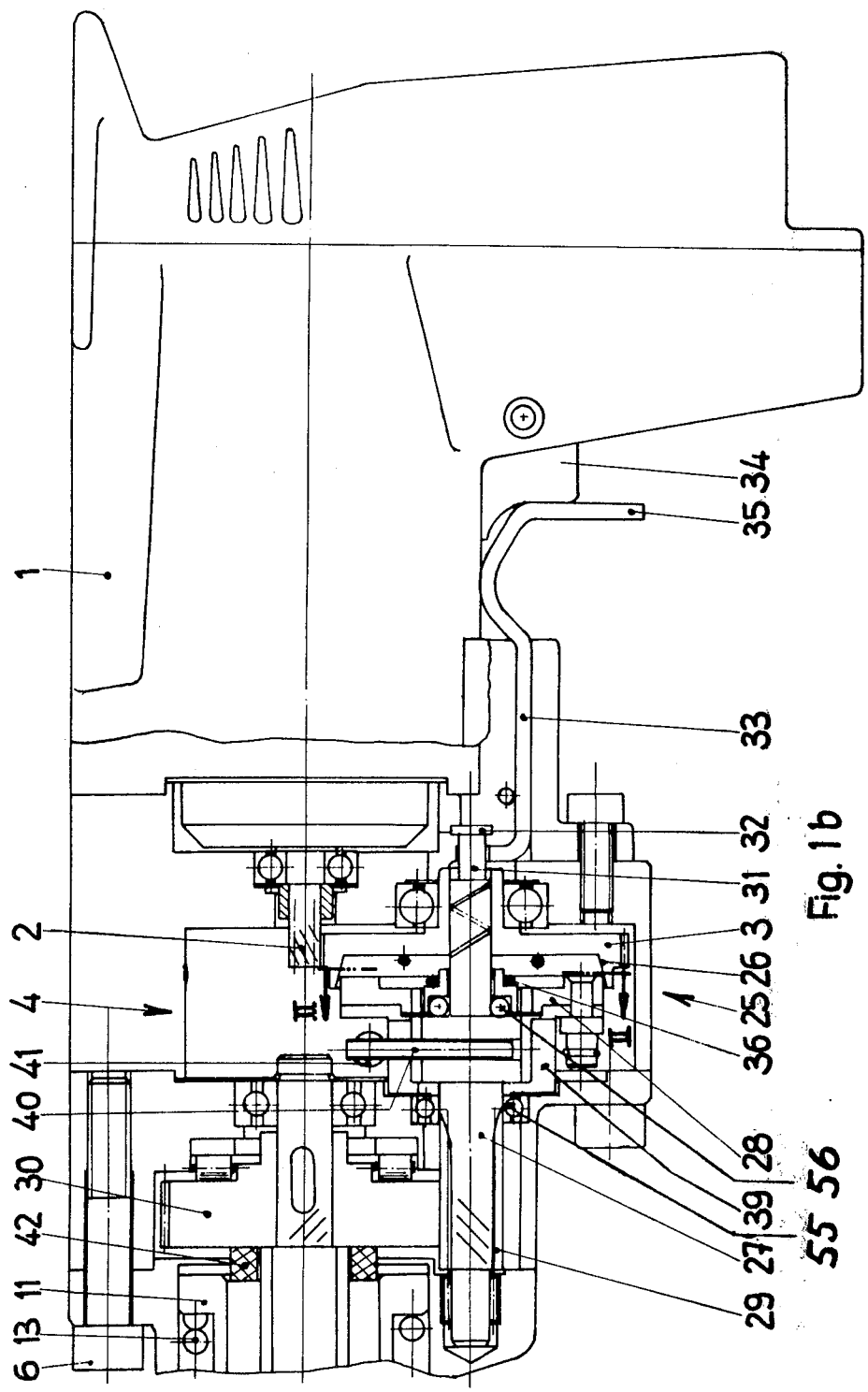
FIG. 1 includes FIGS. 1a and 1b and comprises a longitudinal cross-section through a portable tool for pressing, cutting or the like in accordance with the invention.

The portable tool illustrated in FIGS. 1a and 1b is intended for performing pressing work, but the concept illustrated may be applied to other types of tools as well. Its basic structure consists of a motor housing 1 with the motor of a commercially available drilling machine whose power takeoff pinion 2 engages a gear wheel 3 of a reduction gear 4. The output of the reduction gear 4 comprises spindle 5 with outside screw thread and which is housed in a housing part 7 which is flanged on the motor housing 1 with screws 6. Spindle nut 8 is threaded internally and mounted on spindle 5. It is guided in housing part 7 in a nonrotating but longitudinally shiftable manner. The spindle nut 8 abuts against shoulder 9 of a sleeve 10 which is likewise guided in housing part 7 in a nonrotating and longitudinally shiftable manner and which has an outside flange 11 between which and a shoulder 12 of housing part 7 there is arranged pressure spring 13, surrounding sleeve 10, within housing part 7.

To the free end 14 of sleeve 10 there is connected, with a tension sleeve connection 15, a piston head 17 which is guided in a cylindrical housing segment 16 and which has two rollers 18 and 19 that protrude into slots in housing segment 16. When spindle 5 is actuated, spindle nut 8 moves longitudinally therealong in the direction of rollers 18 and 19, carrying with it sleeve 10, piston 17 and rollers 18 and 19.

At the end of housing segment 16, there is a pressing tool 20 with two swingably positioned, double-arm pressing levers 21 (of which only one is illustrated) whose arms 22, protruding into the slots in housing segment 16, are—upon activation of spindle 5—engaged and moved apart by rollers 18 and 19, so that the pressing tools (not shown) located on the other arms 23 of pressing levers 21 will be pressed together.

In the example illustrated in FIG. 1, the reduction gear 4 comprises a clutch with overload safety which is generally labeled 25. The gear wheel 3, which meshes with the power takeoff pinion 2 of the motor has an interior conical surface 26 which forms one clutch half of clutch 25.

Gear wheel 3 is positioned in a freely rotatable manner on a jackshaft 27 which also carries the other clutch half 28. Jackshaft 27 is positioned in an axially movable manner in housing part 7 and carries helical gearing 29 which engages a gear wheel 30 that is positioned in an axially immovable manner in housing part 7 and which, in turn, is firmly connected with spindle 5.

On the side associated with gear wheel 3, the jackshaft 27 terminates in a pin 31 having abutment 32 which engages rod 33. In the embodiment illustrated, rod 33 is preferably a traction rod which ends in juxtaposition to motor switch 34 on motor housing 1, with an offset 35. Jackshaft 27 is supported on the housing at its left portion as viewed in FIG. 1b by a ball bearing 55.

The activation of rod 33 by exerting traction on offset 35, closes motor switch 34 and the motor is activated. Simultaneously, jackshaft 27 with clutch half 28 is shifted sufficiently to the right as viewed in FIG. 1b—against the action of spring 36 that is arranged between the two clutch halves 28 and 26 and via a ball bearing 56 on clutch half 28—that the clutch half 28 engages inside conical surface 26 of gear wheel 3 and thus closes the clutch, engaging reduction gear 4. In accordance with the clutch force, transmitted via rod 33, the motor output can now be transmitted via the reduction gear 4 to the spindle 5 and the tool 20. The clutch force thus available is set to be sufficient to shift piston head 17 in the direction of pressing tool 20 so that rollers 18 and 19 engage arms 22 of pressing tool 20.

To activate the pressing tools, a greater work output is required than that transmitted from the clutch 25 and this is obtained by the helical gearing 29 of the jackshaft 27 which applies an axial force to jackshaft 27 via gear 30, increasing the coupling pressure of the clutch halves in keeping with the desired transmitted output. So long as the transmitted output is comparatively small, the clutch can again be opened by correspondingly deactivating the rod 33. In this way, using the axial shiftability between jackshaft 27 and gear wheel 3, it is possible to interrupt an initiated work process prior to the attainment of maximum driving force. Within certain limits, it is possible to achieve slipping of the clutch. This is advantageous, for example, in applying and lining up the tool.

To insure that the force applied to the tool does not exceed a predetermined limit, clutch 25 contains an overload safety. For this purpose, there is attached to the jackshaft 27 a gear rim 37 (FIG. 2) and clutch half 28 carries associated inside gearing 38. Clutch half 28 is retained on jackshaft 27 by sleeve 39 that is attached thereto and that surrounds the gear rim 37. The sleeve 39, which is closed at one end, allows a certain amount of axial play between clutch half 28 and jackshaft 27. The end stops which limit the axial movement of clutch half 28 are formed by the front side of the gear rim 37 and the end of sleeve 39.

Clutch half 28 can be rotated with respect to jackshaft 27 within limits. For this purpose, sleeve 39 contains a recess which extends in the circumferential direction and through which there protrudes a pin 40, which is retained on jackshaft 27 and on whose end there is held a spring 41 whose other end is fixed to clutch half 28.

Figure 2:
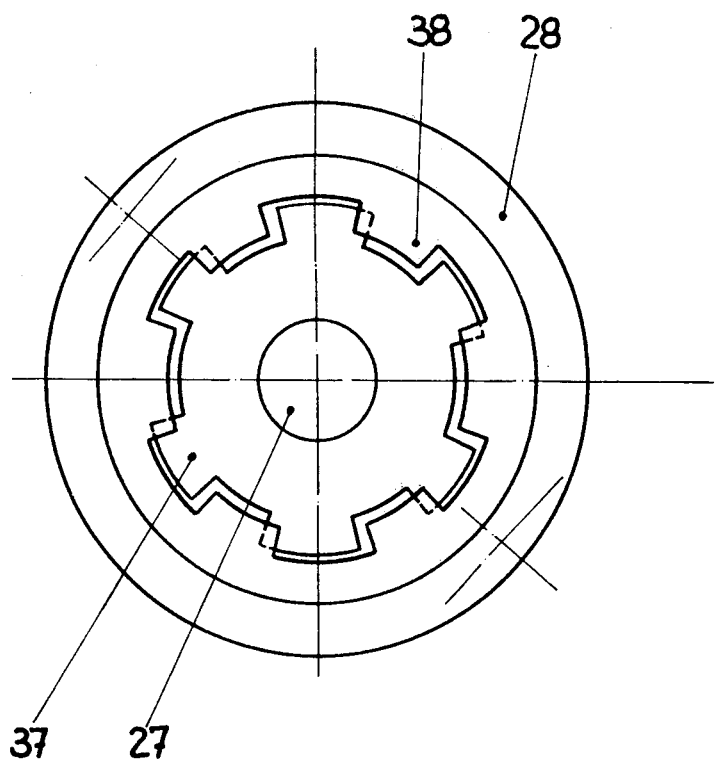
FIG. 2 is a cross-section taken on the line II—II in FIG. 1 and looking in the direction of the arrows.

As can be seen in FIGS. 1 and 2, clutch 25 works as an operating clutch so long as gear rim 37 abuts against the front side of inside gearing 38 of clutch half 28, with the two sets of gear teeth staggered with respect to each other. If there is an overload, the axial force transmitted to jackshaft 27 by gear 30 via helical gearing 29 rotates clutch half 28 with respect to jackshaft 27 and the teeth of gear rim 37 mesh with the teeth of inside gearing 38. This also brings about a relative axial shift between clutch half 28 and jackshaft 27 which results in the opening of clutch 25. The press-on force at the cone of the clutch drops to zero and the loaded spindle is released as a result of return rotation. It should be apparent that the load-dependent switch-off can be adjusted by suitably dimensioning spring 41 which is connected between jackshaft 27 and clutch half 28.

If clutch 25 is opened—either due to the response of the load-dependent switch-off or after termination of the work process when rod 33 is released—then sleeve 10 of the spindle is affected by pressure spring 13 which is under tension during the working stroke. As a result of the pressure exerted by spring 13, sleeve 10 and spindle nut 8, are shifted in the direction of gear wheel 30 until the spindle nut 8 runs into stop 42. At the same time, gear wheel 30, jackshaft 27, and clutch half 28 are rotated in reverse to their initial positions. This action of spring 13 becomes effective as soon as reduction gear 4 no longer provides any substantial output to spindle 5.

Figure 3A:
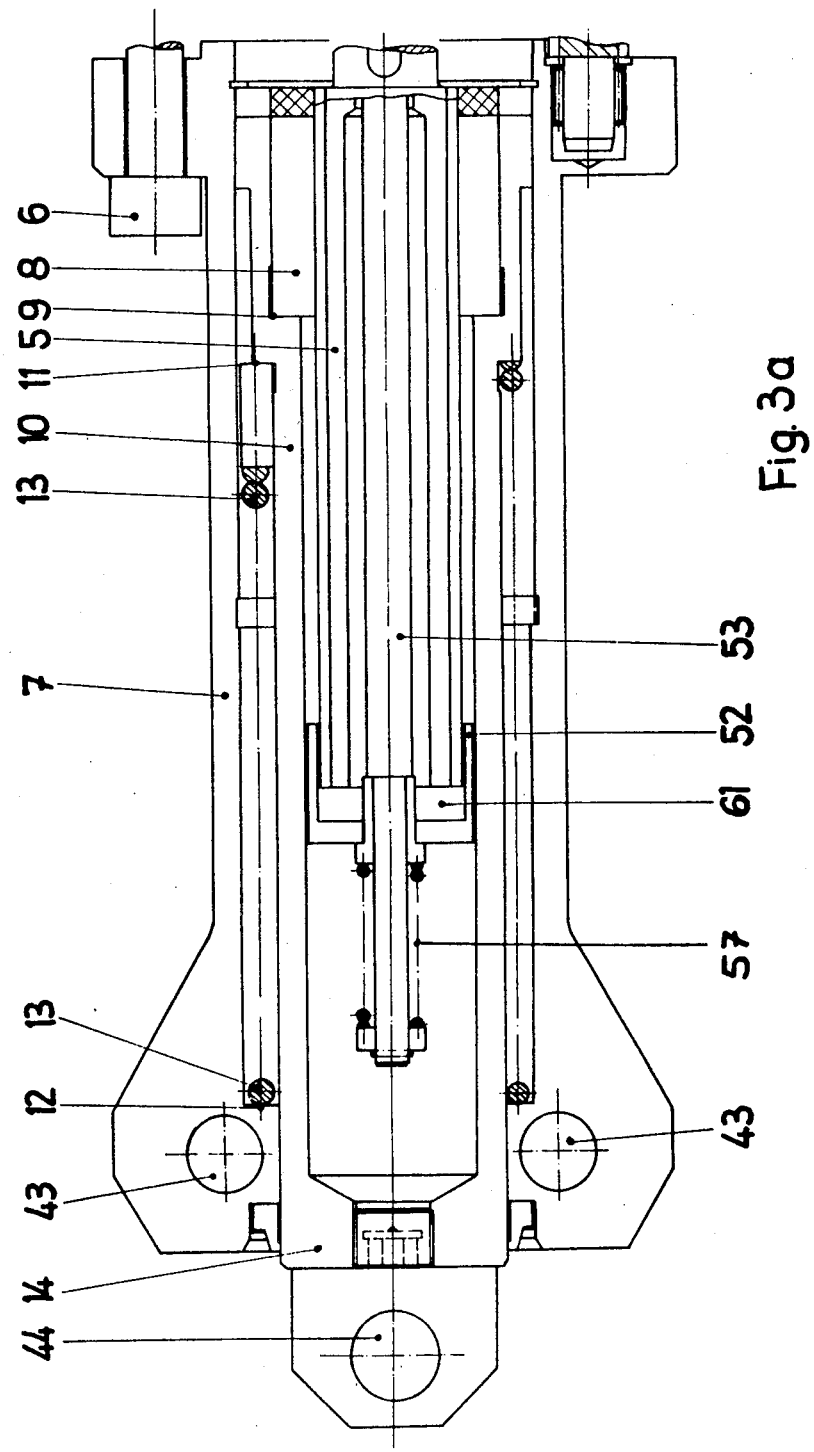
FIG. 3 includes FIGS. 3a and 3b and comprises a partial longitudinal cross-section of a second embodiment of a portable tool for pressing, cutting or the like in accordance with the invention.
Figure 3B:
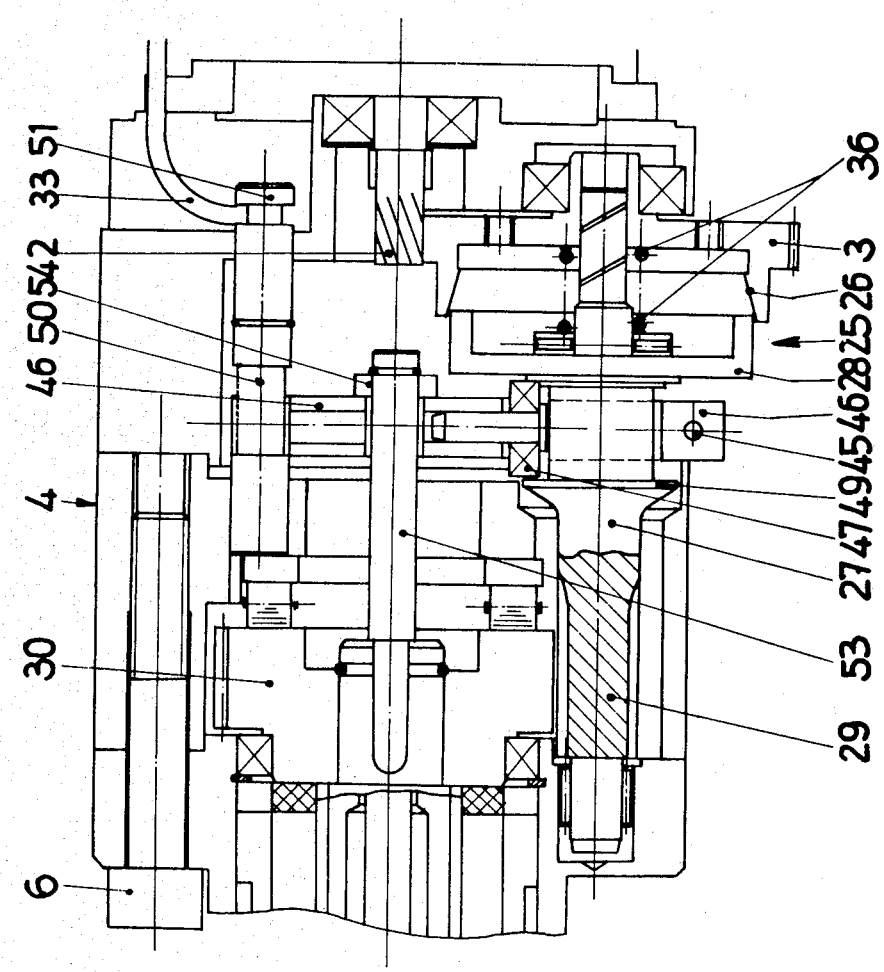
Figure 4:
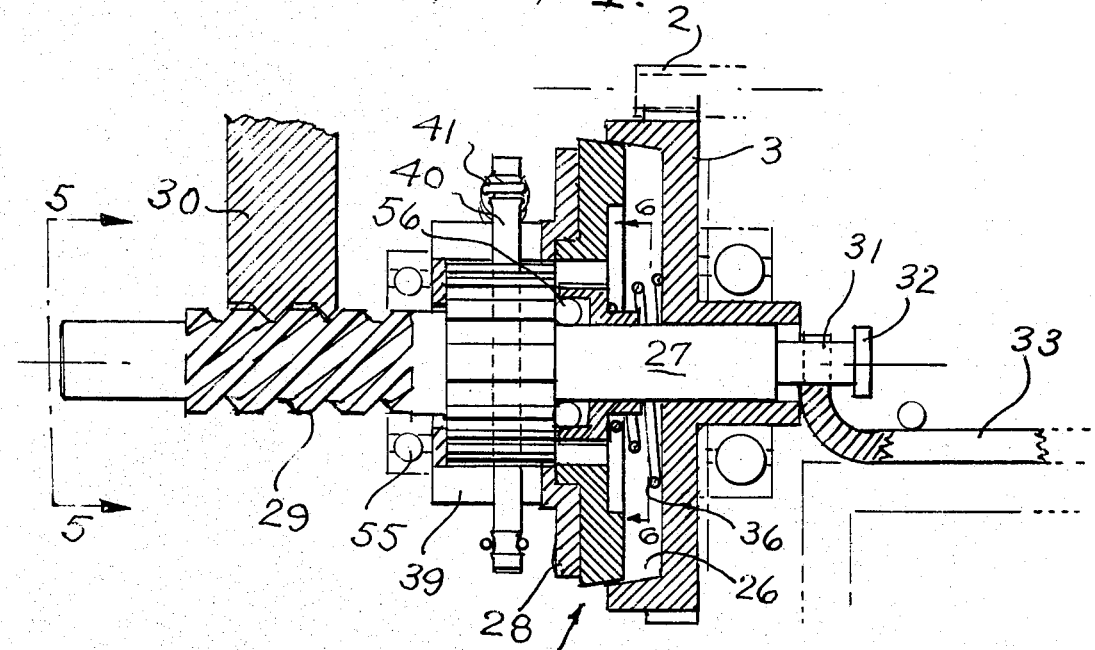
FIG. 4 is a broken away enlarged cross-sectional detail of the view set forth in FIG. 1b.
Figure 5:
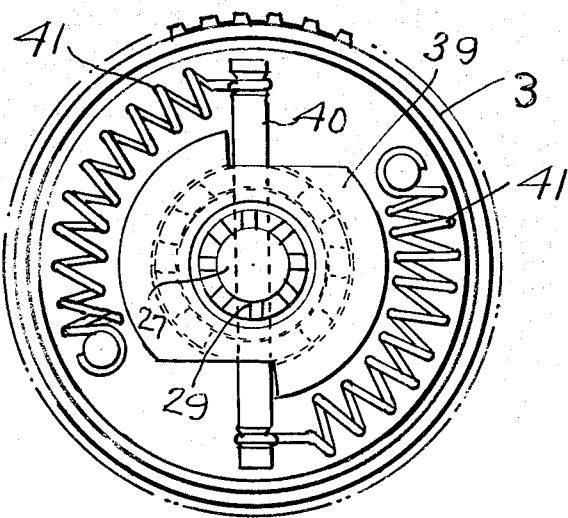
FIG. 5 is a cross-section looking in the direction of the arrows 5—5 in FIG. 4.
Figure 6:
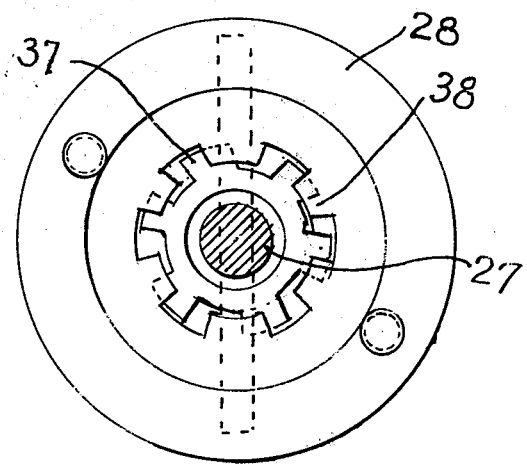
FIG. 6 is a cross-section taken on the line 6—6 in FIG. 4 and looking in the direction of the arrows.

In the example illustrated in FIGS. 3a and 3b the same reference numbers refer to the same parts. The tool illustrated is set up for the attachment of a cutting tool not illustrated in detail and for this purpose, housing part 7, has abutments 42 and 43 and, at end 14 of sleeve 10, an abutment 44 which can be moved with sleeve 10.

Clutch 25 is arranged on the same gear step of the reduction gear 4 as in the example according to FIG. 1. But in this case the overload safety is not part of the clutch. Clutch half 28 is firmly connected with jackshaft 27 which is movably positioned in housing part 7.

A fork 46, which is swingably positioned under the jackshaft 27 at 45, wraps around jackshaft 27 and, with a roller bearing 47, is supported on the one hand, on the reverse side of clutch half 28 and, on the other hand, on a shoulder 49 of jackshaft 27. Above jackshaft 27, the fork is flexibly held on a pin 50 which is positioned in an axially movable fashion in housing part 7. At the end 51 of pin 50, which faces toward motor housing 1 (not shown), there is engaged rod 33 which is guided out of the housing and which serves to activate clutch 25. As can be seen, force exerted on rod 33 toward the right in FIG. 3b causes fork 46 to swing around such that the two clutch halves are pressed against each other, against the action of spring 36 which is connected therebetween. A further increase in the clutch force is brought about, as described above, by the axial force which is introduced into jackshaft 27 via the helical gearing 29 and gear 30.

In order to prevent overload and to limit the spindle movement distance, there is provided an end stop 61 for the stroke movement of spindle nut 8. This end stop 61 consists of a pot-like structural element which is arranged on the end of spindle 5 and whose casing 52 is disposed between hollow spindle 5 and sleeve 10 which surrounds spindle 5. The end stop 61 is attached to rod 53 which is guided through hollow spindle 5 and hollow gear wheel 30 and is flexibly connected to fork 46 at 54. The rod 53 is supported on end stop 61 with a spring 57. The spring 57 is prestressed and prevents the accidental opening of the clutch.

When spindle nut 8, during its forward movement, runs into end stop 61, it carries it and the connected rod 53 along for a short distance against the force of spring 57. Simultaneously fork 46 is swung around so that clutch 25 is opened. This means that no further output is being transmitted from gear 4 and the tensioned spring 13, between sleeve 10 and housing 7 is released, returning the tool and the spindle to their initial positions. The next work operation can then be started by activating rod 33.

I claim:

1. In a power driven tool, having a motor with a power takeoff pinion and a clutch for engaging the pinion with means for driving an output spindle, the improvement comprising:
   (a) a fixed clutch half coupled to said power takeoff pinion;
   (b) a movable clutch half coupled to said means for driving said output spindle;
   (c) means for urging said clutch halves together in proportion to the output torque transmitted by said output spindle, comprising a shaft on which both said clutch halves are mounted and means mounted on said output spindle and engaging said shaft for moving said shaft in a direction so as to urge said clutch halves into tighter engagement; and
   (d) means for disengaging said clutch halves when said output torque of said output spindle exceeds a predetermined limit, comprising a gear rim mounted on said shaft which normally engages inside gearing mounted on said movable clutch half so as to urge said movable clutch half into engagement with said fixed clutch half when said shaft is displaced in an axial direction, said movable clutch half being axially displaceable with respect to said shaft in response to said overload condition so as to move said clutch halves out of engagement in response to said condition, the teeth of said gear rim and the teeth of said inside gearing normally abutting against each other, but meshing with each other in the presence of an overload condition so as to permit the axial displacement of said movable clutch half with respect to said shaft.

2. The power driven tool set forth in claim 1, wherein said means mounted on said output spindle comprises a rotatable gear means and said shaft comprises gear means engaging said rotatable gear means.

3. The power driven tool set forth in claim 2, wherein said shaft comprises helical gearing on its outside periphery and said rotatable gear meshes with said helical gearing.

4. The power driven tool set forth in claim 3, further including first spring means disposed between said clutch halves so as to normally urge said clutch halves apart.

5. The power driven tool set forth in claim 4, wherein said motor, power takeoff pinion, clutch and output spindle are disposed within a housing having a longitudinal axis, said shaft being mounted within said housing parallel to said longitudinal axis, said output spindle being disposed parallel to said longitudinal axis and said rotatable gear being mounted on said output spindle and driven thereby so as to engage said helical gearing on said shaft in such a manner as to urge said clutch halves together.

6. The power driven tool set forth in claim 5, further comprising means mounted outside said housing for simultaneously activating said motor and urging said clutch halves together.

7. The power driven tool set forth in claim 6, wherein said simultaneous activating means comprises trigger switch means for activating said motor and means coupled to said shaft, extending outside said housing into juxtaposition with said trigger means, so that when said trigger switch means is manually closed, said coupled means is urged in a direction so as to displace said shaft in a direction urging said clutch halves together against the force of said first spring means.

8. The power driven tool set forth in claim 7, wherein said shaft comprises end stop means so as to limit the travel of said shaft in said direction.

9. The power driven tool set forth in claim 5, wherein said spindle is coupled to means for engaging said tool.

10. The power driven tool set forth in claim 9, wherein said tool engaging means comprises a spindle nut threaded on said spindle and movable in a direction parallel to said longitudinal axis in response to the rotation of said spindle by said spindle driving means.

11. The power driven tool as set forth in claim 10, wherein said spindle driving means comprises further gear means driven by said clutch means, when said two clutch halves are engaged.

12. The power driven tool as set forth in claim 11, wherein said tool engaging means comprises sleeve means surrounding said spindle and engaged by said spindle nut and second spring means normally urging said sleeve away from said tool.

13. The power driven tool as set forth in claim 1, further including spring biasing means normally retaining said two sets of gear teeth in abutting relationship and wherein said abutting relationship is maintained until the torque transmitted by said rotatable gear means and said shaft is sufficient to overcome the force of said spring biasing means so as to permit the axial displacement of said movable clutch half with respect to said shaft.

14. The power driven tool as set forth in claim 13, wherein said spring biasing means is attached between a hollow sleeve having one closed end and fixedly mounted on said shaft and said movable clutch half and wherein said gear rim is mounted within said sleeve.

* * * * *